Aug. 29, 1933.                    B. E. MILLS                    1,924,619
PROTECTIVE DEVICE FOR CONTROL CIRCUIT OF ELECTRIC PHONOGRAPH OR THE LIKE
                              Filed Jan. 14, 1931
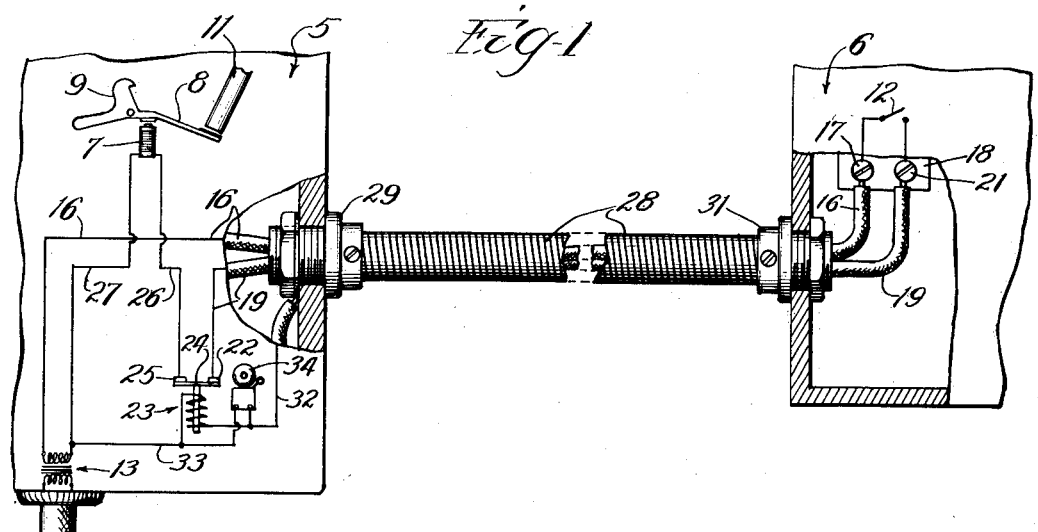
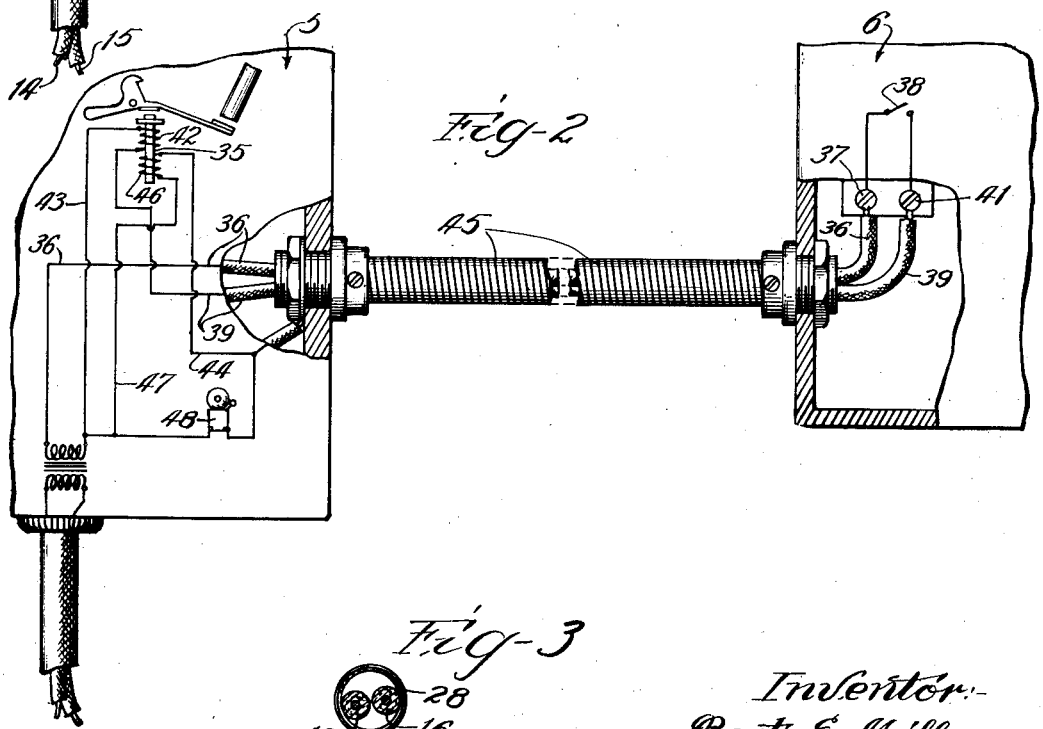
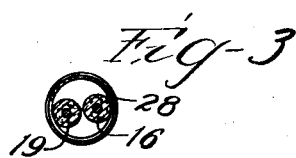
Inventor:-
Bert E. Mills,
By- Carl S. Lloyd
Atty.

Patented Aug. 29, 1933

1,924,619

UNITED STATES PATENT OFFICE 1,924,619

PROTECTIVE DEVICE FOR CONTROL CIRCUIT OF ELECTRIC PHONOGRAPH OR THE LIKE

Bert E. Mills, Oak Park, Ill., assignor to Mills Novelty Company, Chicago, Ill., a corporation of Illinois Application January 14, 1931. Serial No. 508,643

9 Claims. (Cl. 194—97)

This invention relates to a protective device for preventing the fraudulent operation of coin-controlled, electrically operated phonographs, or the like, when the same are adapted to be controlled from a remote point as, for example, from a wall box which may be placed some distance from the machine itself.

In the usual installation of such instruments the control circuits are arranged so that the machine may be operated from one or more wall boxes which are placed in various parts of the room to suit the convenience of the customers. Each wall box is provided with a coin switch which is connected by leads to a suitable circuit controller which in turn controls the operation of the machine. Even though the wires leading to the wall boxes are ordinarily protected by flexible cable, it not infrequently happens that a customer will fraudulently obtain a free performance by cutting through the cable and shorting the lead wires, thereby closing the circuit to the machine without using a coin.

According to my invention, I provide in conjunction with the coin-controlled playing circuit, a protective circuit which renders the playing circuit ineffective to actuate the machine when an attempt is made to obtain free operation by cutting through the cable and closing the lead wires which connect the circuit controller with the wall boxes.

The invention will be fully understood from the following detailed description, which, taken in connection with the accompanying drawing, discloses a preferred embodiment thereof.

Referring to the drawing:

Fig. 1 is a diagrammatic view of a coin-controlled playing circuit provided with the protective device of my invention;

Fig. 2 is a similar view showing a modified form of the protective device; and

Fig. 3 is a cross section taken through the cable connecting the wall box to the circuit controller.

Referring to the drawing in detail, and particularly to Fig. 1, the numeral 5 designates a portion of a coin-operated circuit controller, and the numeral 6 designates a portion of a wall box located at a remote point with respect to the circuit controller 5. The circuit controller is preferably of the automatic type and may be used to control the starting and stopping of any desired type of machine, such as an automatic phonograph, radio, or the like. One form of circuit breaker which may be used for this purpose is shown in my co-pending application, S/N 427,670, filed February 12, 1930.

In the present instance only a portion of the circuit breaking mechanism is shown. This includes an electromagnet 7, the armature 8 of which is provided with an escapement mechanism 9 which controls the movement of a spring-actuated ratchet wheel (not shown) which is provided with means for breaking the circuit to the controlled machine after the rendition of service corresponding to the number of coins introduced. The armature 8, in addition to being controlled from a remote station through the electromagnet 7, in a manner presently to be explained, may also be operated from a local paying station by introducing a proper coin through a coin chute 11, which is positioned to direct the coin against the end of the armature 8. Ordinarily the circuit breaker 5 is located directly on the phonograph or other instrument which it controls. However, it may be located at any convenient point.

The electromagnet 7 is energized by dropping a coin in the wall box 6 in which is provided a coin switch 12. Current supply for this remote control circuit is taken from the secondary of a transformer 13, the primary of which is connected by wires 14 and 15 to a suitable source of current supply. One side of the line is taken from the secondary of the transformer 13 through a lead 16 to a post 17 carried by a terminal block 18 in the wall box 6. A return lead 19, connected at 21 to a post on block 18, carries the circuit to a terminal 22. A relay, indicated generally by the numeral 23, is provided with an armature 24 which carries the return from the terminal 22 to a terminal 25, from which point a wire 26 connects with the coil of the electromagnet 7. A wire 27 connects the other end of the coil of the electromagnet with the opposite side of the line. Assuming the armature 24 is in position to bridge the terminals 22 and 25, as shown, it will be apparent that upon depositing a coin in box 6 to close the coin switch 12, current will flow through the coil of the electromagnet 7 to actuate the armature 8. This operation closes the circuit through the phonograph or other instrument, the operation of which is to be controlled.

The leads 16 and 19 which connect the wall box with the circuit breaker are protected by a flexible armored cable 28, the opposite ends of which are anchored by suitable connectors 29 and 31 in the casings of the circuit breaker 5 and wall box 6, respectively. If the cable 28 were cut by a knife blade until the leads 16 and 19 become shorted, the electromagnet 7 would be energized since the effect would be the same as if the switch 12 were closed by a coin. In order to avoid fraudulent operation of the control circuit in this manner, I provide a protective circuit which is designed to prevent energization of the electromagnet 7, and consequent operation of the controlled machine, by cutting through the cable 28.

The protective circuit comprises the relay 23, the armature 24 of which bridges the terminals 22 and 25; a wire 32, which connects one end of the coil of the relay with the cable 28; and a wire 33 which connects the other end of the coil of the relay to the return side of the line. In order to energize the electromagnet 7 by cutting through the cable 28, it would be necessary to have the blade of the knife touch both the lead 16 and lead 19. In doing this the blade of the knife would inevitably touch the cable 28, and immediately current would flow from the lead 16 through the blade of the knife to the cable 28 and thence through the wire 32 and the relay 23, which would thereupon be energized to break the control circuit by pulling the armature 24 away from the terminals 22 and 25. Hence, even though the control circuit were thus shorted by the knife blade, the electromagnet 7 would not be energized since its circuit would be immediately opened by operation of the relay 23. The protective circuit would operate in this manner regardless of where the cable 28 were cut, inasmuch as the portion of the cable lying between the circuit breaker 5 and the point of cutting, itself forms a part of the protective circuit.

If desired, a bell 34 may be placed in the protective circuit in parallel with the relay 23. When the protective circuit is closed to operate the relay 23 the bell 34 will ring to indicate to the proprietor that a fraudulent operation is being attempted. A signal of this nature obviously serves as an added deterrent for preventing fraudulent operation of the machine.

In the modified form shown in Fig. 2 I have substituted for the relay 23 of Fig. 1 a compensating coil for preventing the energization of an electromagnet 35, which corresponds to the electromagnet 7 of Fig. 1. The control circuit for energizing the electromagnet 35 includes a lead 36 which connects at 37 to one side of a coin switch 38; a return lead 39, connecting at 41 to the other side of the coin switch 38, the opposite end of said lead connecting with a coil 42 which energizes electromagnet 35; and a return wire 43 leading to the opposite side of the line. When the coin switch 38 is closed this circuit energizes electromagnet 35 to start operation of the phonograph or other instrument.

The protective circuit comprises; a wire 44, which connects at one end to an armored cable 45, which corresponds to cable 28 of Fig. 1, and at the other end to a compensating coil 46 which is wound around the core of electromagnet 35 in a direction opposite to coil 42; and a return wire 47 connecting with return wire 43. The operation of this circuit is substantially equivalent to the operation of the relay circuit of Fig. 1. When the leads 36 and 39 are shorted by the knife blade the cable 45 will be touched by the blade so that current will flow through the compensating coil 46 to neutralize the effect of the current flow in coil 42, thus preventing energization of electromagnet 35 and consequent operation of the instrument. It will be understood that the coils 42 and 46 are both wound on the core of electromagnet 35. The windings, however, are reversed relative to one another so that when both coils are energized the flux produced by one neutralizes that produced by the other.

A signal bell 48 may be inserted in the circuit in parallel with the compensating coil 46 to warn the proprietor of an attempted fraudulent operation. As in the form shown in Fig. 1, this arrangement prevents fraudulent operation of the instrument regardless of the point at which the knife blade is inserted inasmuch as the portion of the cable 45 lying between the circuit breaker 5 and the point of cutting, itself forms a part of the protective circuit.

The circuit breaker 5 may be used to control any type of instrument, such as a phonograph, a radio, or the like. The novelty of the invention is not dependent upon the particular type of instrument which is ultimately controlled by the circuit breaker. Accordingly, when referring to an electrically actuated machine, or to a controlled machine, in the appended claims, it is the circuit breaker, or an equivalent actuating means, which is referred to, that being the only portion of the controlled machine which is directly related to the invention.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. The combination with an electrically-operated machine, a coin-controlled circuit, including a coin switch for controlling the operation thereof, and a metallic cable for shielding the leads from said switch to said machine, of a protective device including a circuit for rendering the coin-controlled circuit inoperative to actuate the machine when closed by cutting through the cable, said protective circuit including as a part thereof the portion of one of the leads and the portion of the cable lying between the point of cutting and the controlled machine.

2. The combination with an electrically-operated machine, a coin-controlled circuit, including a coin switch for controlling the operation thereof, and a metallic cable for shielding the leads from said switch to said machine, of electrically-operated means for rendering the coin-controlled circuit inoperative to actuate the machine when closed by cutting through the cable, said means including a relay for opening the coin-controlled circuit, the relay circuit including as a part thereof the portion of one of the leads and the portion of the cable lying between the point of cutting and the controlled machine.

3. The combination with a coin-controlled circuit, including an electromagnetic actuator, a coin switch located at a point remote from said actuator, leads connecting said actuator and switch, and a metallic cable for shielding said leads, of electrically-operated means for rendering the coin-controlled circuit inoperative to energize said actuator when closed by cutting through the cable, said means including a compensating coil for preventing energization of the actuator, the circuit of said coil including as a part thereof the portion of one of the leads and the portion of the cable lying between the point of cutting and the actuator.

4. The combination with an electrically-operated machine, a coin-controlled circuit, including a coin switch, for controlling the operation thereof, and a conductive shield for the leads from said switch to said machine, of electrically-operated means for rendering said coin-controlled circuit inoperative to actuate the machine when said circuit is closed by cutting through said shield, said means including a circuit, one side of which includes a portion of said shield between the point of cutting thereof and the controlled machine.

5. The combination with an electrically-operated machine, a coin-controlled circuit, including a coin switch, for controlling the operation thereof, and a shield for the leads from said switch to said machine, of a protective device for preventing completion of said coin-controlled circuit in case of cutting through said shield for the purpose of closing said circuit without depositing a coin to operate said switch, said device comprising a circuit including a portion of said shield completed by a knife blade inserted into the shield, and means operated by the closing of said last-mentioned circuit for holding said coin-controlled circuit open until said knife is removed.

6. In combination, an electrically-actuated machine, a coin-controlled circuit, including a coin switch for energizing said machine, and an electrically-operated device, including a protective circuit adapted to be closed when the coin-controlled circuit is closed by an instrument applied to the wires thereof elsewhere than at the coin switch, and means controlled by said circuit for preventing effective action of the coin-controlled circuit while the protective circuit remains closed, said means being operative upon removal of said instrument to restore the coin-controlled circuit to condition for normal operation thereof through said coin switch.

7. In combination, an electrically-actuated machine, a coin-controlled circuit for energizing the same, said circuit including a coin switch positioned at a point remote from the controlled machine, and an electrically-operated device, including a protective circuit adapted to be closed when the coin-controlled circuit is closed by an instrument applied to the wires thereof elsewhere than at the coin switch, and means controlled by said circuit for preventing effective action of the coin-controlled circuit while the protective circuit remains closed, said means being operative upon removal of said instrument to restore the coin-controlled circuit to condition for normal operation thereof through said coin switch.

8. In combination an electrically-actuated machine, a coin-controlled circuit, including a coin switch, for energizing said machine, and an electrically-operated device, including a protective circuit adapted to be closed when the coin-controlled circuit is closed by an instrument applied to the wires thereof elsewhere than at the coin switch, and means controlled by said circuit for preventing effective action of the coin-controlled circuit while the protective circuit remains closed, said means comprising a relay for opening the coin-controlled circuit and being adapted to restore said circuit to condition for normal operation through said coin switch when said instrument is removed.

9. In combination, an electric circuit, including an electro-magnetic actuator, a coin-controlled switch for closing said circuit to energize the actuator, and an electrically-operated device, including a protective circuit adapted to be closed when the coin-controlled circuit is closed by an instrument applied to the wires thereof, and means controlled by said protective circuit to prevent operation of said actuator while the protective circuit remains closed, said means comprising a compensating coil adapted to be de-energized when said instrument is removed, thereby placing said circuit in condition for normal operation through said coin switch.

BERT E. MILLS.